(12) United States Patent
Okoroafor et al.

(10) Patent No.: US 7,087,698 B1
(45) Date of Patent: Aug. 8, 2006

(54) METHOD OF PREPARING AN OPTICAL POLYMERIZATE

(75) Inventors: Michael O. Okoroafor, Export, PA (US); Robert A. Smith, Murrysville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 40 days.

(21) Appl. No.: 09/695,325

(22) Filed: Oct. 25, 2000

Related U.S. Application Data

(60) Provisional application No. 60/166,184, filed on Nov. 18, 1999.

(51) Int. Cl.
| | |
|---|---|
| C08G 18/10 | (2006.01) |
| C08G 18/32 | (2006.01) |
| C08G 18/38 | (2006.01) |
| C08G 18/46 | (2006.01) |
| C08G 18/72 | (2006.01) |

(52) U.S. Cl. .......................... 528/60; 348/902; 359/241; 359/244; 359/642; 428/423.1; 528/61; 528/63; 528/64; 528/73

(58) Field of Classification Search ................. 528/60, 528/61, 63, 64, 73; 428/423.1; 348/902; 359/241, 244, 642
See application file for complete search history.

(56) References Cited

U.S. PATENT DOCUMENTS

| | | | | |
|---|---|---|---|---|
| 2,370,567 | A | 2/1945 | Muskat et al. | 558/265 |
| 2,403,113 | A | 7/1946 | Muskat et al. | 526/314 |
| 3,361,706 | A | 1/1968 | Meriwether et al. | 252/586 |
| 3,562,172 | A | 2/1971 | Ono et al. | 252/300 |
| 3,567,605 | A | 3/1971 | Becker | 204/158 |
| 3,578,602 | A | 5/1971 | Ono et al. | 252/300 |
| 4,153,777 | A | 5/1979 | Slagel | 528/60 |
| 4,166,043 | A | 8/1979 | Uhlmann et al. | 252/300 |
| 4,215,010 | A | 7/1980 | Hovey et al. | 252/300 |
| 4,342,668 | A | 8/1982 | Hovey et al. | 252/586 |
| 4,367,170 | A | 1/1983 | Uhlmann et al. | 252/586 |
| 4,637,698 | A | 1/1987 | Kwak et al. | 351/163 |
| 4,808,690 | A | 2/1989 | Slagel | 528/60 |
| 4,816,584 | A | 3/1989 | Kwak et al. | 544/71 |
| 4,818,096 | A | 4/1989 | Heller et al. | 351/163 |
| 4,826,977 | A | 5/1989 | Heller et al. | 544/70 |
| 4,866,103 | A * | 9/1989 | Cassidy et al. | 521/159 |
| 4,880,667 | A | 11/1989 | Welch | 427/160 |
| 4,931,219 | A | 6/1990 | Kwiatkowski et al. | 252/586 |
| 4,931,220 | A | 6/1990 | Haynes et al. | 252/586 |
| 5,066,818 | A | 11/1991 | Van Gemert et al. | 549/389 |
| 5,128,433 | A * | 7/1992 | LeCompte et al. | 528/60 |
| 5,274,132 | A | 12/1993 | Van Gemert | 549/389 |
| 5,352,758 | A * | 10/1994 | Kanemura et al. | 528/85 |
| 5,384,077 | A | 1/1995 | Knowles | 252/586 |
| 5,384,379 | A | 1/1995 | Bader et al. | 526/286 |
| 5,405,958 | A | 4/1995 | Van Gemert | 544/71 |
| 5,429,774 | A | 7/1995 | Kumar | 252/586 |
| 5,466,398 | A | 11/1995 | Van Gemert et al. | 252/586 |
| 5,498,686 | A | 3/1996 | Effer et al. | 528/76 |
| 5,631,339 | A | 5/1997 | Faler et al. | 528/45 |
| 5,679,756 | A | 10/1997 | Zhu et al. | 528/65 |
| 5,693,738 | A | 12/1997 | Okazaki et al. | 528/51 |
| 5,739,243 | A | 4/1998 | Herold et al. | 526/325 |
| 5,811,506 | A | 9/1998 | Slagel | 528/64 |
| 5,917,006 | A | 6/1999 | Smith et al. | 528/373 |
| 5,932,681 | A | 8/1999 | Herold et al. | 528/81 |
| 5,942,158 | A | 8/1999 | Okoroafor et al. | 252/586 |
| 5,961,889 | A | 10/1999 | Jiang et al. | 252/582 |
| 5,962,617 | A | 10/1999 | Slagel | 528/61 |
| 5,962,619 | A | 10/1999 | Seneker et al. | 528/64 |
| 5,976,422 | A | 11/1999 | Okoroafor et al. | 252/586 |
| 6,127,505 | A * | 10/2000 | Slagel | 528/61 |

FOREIGN PATENT DOCUMENTS

| | | |
|---|---|---|
| EP | 0 329 387 | 8/1989 |
| GB | 1 501 801 | 2/1978 |
| JP | 62195383 A | 8/1978 |

OTHER PUBLICATIONS

Grant et al.; Grant & Hackh's Chemical Dictionary, Fifth Edition; McGraw-Hill Book Company; New York; 1987; p. 166.*

American Society for Testing and Materials, *Standard Test Method for Index of Refraction of Transparent Organic Plastics*. Designation: D 542-95. pp. 1-3.

American Society for Testing and Materials, *Standard Test Method for Indentation Hardness of Rigid Plastics by Means of a Barcol Impressor*. Designation: D 2583-95, pp. 1-3.

* cited by examiner

*Primary Examiner*—Rabon Sergent
(74) *Attorney, Agent, or Firm*—Deborah M. Altman; Carol A. Marmo

(57) ABSTRACT

The present invention is directed to a novel method of preparing a polymerizate, which includes the step of polymerizing a two-component composition, which includes: a first component containing at least one polycyanate reactant having at least two functional groups selected from isocyanate, isothiocyanate and combinations thereof, the polycyanate reactant being the reaction product of: a polythiol monomer having at least two thiol groups; and a polycyanate monomer having at least two functional groups selected from isocyanate, isothiocyanate and combinations thereof; and a second component containing at least one polyamine reactant having at least two functional groups selected from primary amine, secondary amine and combinations thereof. The present invention is also directed to polymerizates prepared according to the method of the present invention. The present invention is further directed to photochromic articles that may be prepared from the polymerizates of the present invention.

100 Claims, No Drawings

METHOD OF PREPARING AN OPTICAL POLYMERIZATE

CROSS-REFERENCE TO RELATED APPLICATIONS

This application claims priority from U.S. Provisional Patent Application Ser. No. 60/166,184 filed Nov. 18, 1999 and entitled "Method of Preparing an Optical Polymer".

BACKGROUND OF THE INVENTION

1. Field of the Invention

The present invention relates to a method of preparing a polymerizate from a two-component organic composition, the polymerizate having a refractive index of at least 1.6, an Abbe number of at least 33 and an initial Barcol hardness of at least 1. More particularly, the present invention relates to polymerizing certain two-component organic compositions comprising at least one polycyanate reactant having at least two isocyanate and/or isothiocyanate groups, and a polyamine having at least two primary and/or secondary amine groups. The present invention also relates to polymerizates and photochromic articles.

2. Description of the Prior Art

A number of organic polymeric materials, e.g., plastics, have been developed as alternatives and replacements for glass in applications such as optical lenses, fiber optics, windows and automotive, nautical and aviation transparencies. As used herein, the term 'glass' is meant to refer to silica-based inorganic glass. These polymeric materials can provide advantages relative to glass, including, shatter resistance, lighter weight for a given application, ease of molding and ease of dying. Representative examples of such polymeric materials include, poly(methyl methacrylate), thermoplastic polycarbonate and poly[diethylene glycol bis(allylcarbonate)].

The refractive indices of many polymeric materials are generally lower than that of glass. For example, the refractive index of poly[diethylene glycol bis(allylcarbonate)] is about 1.50, compared to that of high index glass, which can range, for example, from 1.60 to 1.80. When fabricating lenses to correct a given degree of visual defect, e.g., a correction for myopia, the use of a polymeric material having a lower refractive index will require a thicker lens relative to a material having a higher refractive index, e.g., high index glass. When the degree of correction required is substantial, as in the case of severe myopia, a lens fabricated from a low index polymeric material can be required to be very thick. A very thick lens may negate any benefit resulting from the use of lower density lens materials relative to an equivalent degree of correction obtained from a higher refractive index glass lens. In addition, thicker optical lenses are not aesthetically desirable.

It is known that polymeric materials having refractive indices greater than 1.50 can be prepared from aromatic monomers and monomers containing halogens and/or sulfur atoms. The materials from which lenses, and in particular optical lenses, are fabricated can be categorized by their refractive indices. As those skilled in the art can appreciate, low indices typically include indices of refraction of from less than 1.50 through 1.53; middle indices comprise indices of refraction of from 1.54 through 1.57; and high indices commonly include indices of refraction of 1.58 and greater. Lenses prepared from polymeric materials having high refractive indices typically also have lower Abbe numbers (also known as nu-values). Lower Abbe numbers are indicative of an increasing level of chromatic dispersion, which is typically manifested as an optical distortion at or near the rim of the lens.

U.S. Pat. No. 5,961,889 to Jiang et al. discloses optical polymers, for use in lenses, prepared from a polythiol group-containing component, a polyisocyanate group-containing component and/or a polyfunctional vinyl group-containing component. The polymers disclosed typically had refractive indices less than 1.69 and Abbe number less than 35.

U.S. Pat. No. 5,932,681 to Herold et al. discloses an optical polymer, for use as a lens material, prepared from an isocyanate or isothiocyanate and a polythiol. The polymers disclosed have a refractive index of at least 1.57 and an Abbe number of at least 33.

U.S. Pat. No. 5,679,756 to Zhu et al. discloses an optical polymer described as a thermoplastic thiourethane-urethane copolymer prepared by reacting an aliphatic diisocyanate with a dithiol to form a thiourethane prepolymer, which is then reacted with a diisocyanate and a polyol. The polymers disclosed typically had a refractive index between 1.57 and 1.60 and Abbe number between 35 and 38.

While the optical polymers discussed above have adequate refractive indices and chromatic dispersion, they do not necessarily have the degree of impact resistance required to be suitable for use as daily wear lenses for eyeglasses.

It is accordingly desirable then to identify new polymeric materials, for example polymerizates, which can be used to prepare transparent polymerizates, particularly optical lenses that possess a combination of high refractive index and adequately high Abbe number as well as possessing the physical properties, in particular impact resistance, that are at least equivalent to and preferably better than those of lower index polymeric materials.

SUMMARY OF THE INVENTION

The present invention provides a method of preparing a polymerizate, which includes the step of polymerizing a two-component composition, which includes:

(a) a first component containing at least one polycyanate reactant having at least two functional groups selected from isocyanate, isothiocyanate and combinations thereof, the polycyanate reactant being the reaction product of:
  (i) a polythiol monomer having at least two thiol groups; and
  (ii) a polycyanate monomer having at least two functional groups selected from isocyanate, isothiocyanate and combinations thereof; and (b) a second component containing at least one polyamine reactant having at least two functional groups selected from primary amine, secondary amine and combinations thereof.

The present invention is also directed to polymerizates prepared according to the method of the present invention.

The present invention is further directed to photochromic articles that may be prepared from the polymerizates of the present invention.

DETAILED DESCRIPTION OF THE INVENTION

Unless otherwise indicated, all numbers or expressions referring to quantities of ingredients, reaction conditions, etc. used herein are to be understood as modified in all instances by the term "about."

The present invention provides a method of preparing a polymerizate, which includes the step of polymerizing a two-component composition comprising:

(a) a first component containing at least one polycyanate reactant having at least two functional groups selected from isocyanate, isothiocyanate and combinations thereof, the polycyanate reactant being the reaction product of, (i) a polythiol monomer having at least two thiol groups;
(ii) a polycyanate monomer having at least two functional groups selected from isocyanate, isothiocyanate and combinations thereof; and
(iii) optionally a reactive hydrogen material having at least two reactive hydrogen groups, the reactive hydrogen material being selected from polyols, materials having both hydroxyl and thiol groups, and mixtures thereof, the relative amounts of (i), (ii) and (iii) being selected such that the molar equivalents ratio of (NCO+NCS)/(SH+OH) is greater than 1.0; and (b) a second component containing at least one polyamine reactant having at least two functional groups selected from primary amine, secondary amine and combinations thereof. The first and second components are selected such that when they are polymerized, they provide a polymerizate having a refractive index of at least 1.6 (e.g., from 1.60 to 1.74), an Abbe number of at least 33 and an initial Barcol hardness of at least 1. The refractive index is determined in accordance with American Standard Test Method (ASTM) number D 542-95. The Abbe number or nu-value is determined using an appropriate instrument, for example a Bausch & Lomb ABBE-3L Refractometer. The initial Barcol hardness (also commonly referred to as a zero second Barcol hardness) is determined in accordance with ASTM No. D 2583-95.

The polycyanate reactant of the first component of the two-component composition has at least two functional groups selected from isocyanate (—NCO), isothiocyanate (—NCS) and combinations of isocyanate and isothiocyanate groups. As used herein, the term "cyanate" refers to isocyanate and isothiocyanate groups that are unblocked (or uncapped), and that are capable of forming a covalent bond with a reactive hydrogen group, e.g., a thiol, hydroxyl or amine group.

The polycyanate reactant is the reaction product of a polythiol monomer, a polycyanate monomer and optionally a reactive hydrogen material, such as a polyol or a material having both hydroxyl and thiol groups. In preparing the polycyanate reactant, the relative amounts of polythiol monomer, polycyanate monomer and optional reactive hydrogen material are selected such that the molar equivalents ratio of (NCO+NCS)/(SH+OH) is greater than 1.0, e.g., from 1.2: 1.0 to 4.0: 1.0 or from 2.0: 1.0 to 3.0: 1.0.

The polycyanate reactant of the first component of the two-component composition has backbone linkages selected from urethane linkages (—NH—C(O)—O—), thiourethane linkages (—NH—C(O)—S—), thiocarbamate linkages (—NH—C(S)—O—), dithiourethane linkages (—NH—C(S)—S—) and combinations thereof. The molecular weight of the polycyanate reactant can vary widely, for example, having a number average molecular (Mn) of from 500 to 15,000, or from 500 to 5000, as determined by gel permeation chromatography (GPC) using polystyrene standards.

Polythiol monomers that are used to prepare the polycyanate reactant have at least two thiol groups and may be selected from aliphatic polythiols, cycloaliphatic polythiols, aromatic polythiols and mixtures thereof. In addition, the polythiol monomer may also contain linkages selected from ether linkages (—O—), sulfide linkages (—S—), polysulfide linkages (—S$_x$—, wherein x is at least 2, e.g., from 2 to 4) and combinations of such linkages. As used herein, by "thiol," "thiol group," "mercapto" or "mercapto group" is meant an —SH group which is capable of forming a thiourethane linkage, (i.e., —NH—C(O)—S—) with an isocyanate group or a dithioruethane linkage (i.e., —NH—C(S)—S—) with an isothiocyanate group.

Examples of polythiol monomers that may be used to prepare the polycyanate reactant include, but are not limited to, 2,5-dimercaptomethyl-1,4-dithiane, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate). Mixtures of polythiol monomers may also be used to prepare the polycyanate reactant.

The polythiol monomer may also be selected from polythiols represented by the following general formula I,

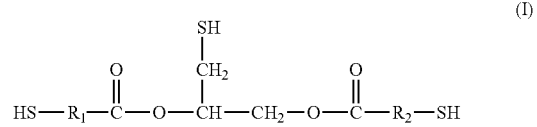

$$\text{HS}-\text{R}_1-\overset{\text{O}}{\underset{\|}{\text{C}}}-\text{O}-\text{CH}-\text{CH}_2-\text{O}-\overset{\text{O}}{\underset{\|}{\text{C}}}-\text{R}_2-\text{SH} \quad (\text{I})$$

with $-\text{CH}_2-\text{SH}$ substituent on the CH wherein R$_1$ and R$_2$ are each independently selected from straight or branched chain alkylene, cyclic alkylene, phenylene and C$_1$–C$_9$ alkyl substituted phenylene. Examples of straight or branched chain alkylene from which R$_1$ and R$_2$ may be selected include, but are not limited to, methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Examples of cyclic alkylenes from which R$_1$ and R$_2$ may each be selected include, but are not limited to, cyclopentylene, cyclohexylene, cycloheptylene, cyclooctylene, and alkyl substituted derivatives thereof. The divalent linking groups R$_1$ and R$_2$ may also be selected from phenylene and alkyl substituted phenylene, e.g., methyl, ethyl, propyl, isopropyl and nonyl substituted phenylene. In a preferred embodiment of the present invention, R$_1$ and R$_2$ are each methylene or ethylene.

The polythiol represented by general formula I may be prepared from an esterification or transesterification reaction between 3-mercapto-1,2-propanediol (Chemical Abstract Service (CAS) Registry No. 96-27-5) and a thiol functional carboxylic acid or carboxylic acid ester in the presence of a strong acid catalyst, e.g., methane sulfonic acid, with the concurrent removal of water or alcohol from the reaction mixture. More particularly, a preferred polythiol monomer, for which R$_1$ and R$_2$ are each methylene with reference to general formula I.

As used herein, the polythiol monomer described and named with reference to general formula I, e.g., thiglycerol bis(2-mercaptoacetate), is meant to include also any related co-product oligomeric species and polythiol monomer compositions containing residual starting materials. For example, when washing the reaction mixture resulting from the esterification of 3-mercapto-1,2-propanediol and a thiol functional carboxylic acid, e.g., 2-mercaptoacetic acid, with excess base, e.g., aqueous ammonia, oxidative coupling of thiol groups may occur. Such an oxidative coupling can result in the formation of oligomeric polythiol species having disulfide linkages, i.e., —S—S— linkages.

The polythiol monomer used to prepare the polycyanate reactant may be a polythiol oligomer having disulfide linkages, which is prepared from the reaction of a polythiol monomer having at least two thiol groups and sulfur in the presence of a basic catalyst. The molar equivalent ratio of polythiol monomer to sulfur is from m to (m−1) wherein m is an integer from 2 to 21. The polythiol monomer may be selected from those examples as recited previously herein, e.g., 2,5-dimercaptomethyl-1,4-dithiane. The sulfur used may be in the form of, for example, crystalline, colloidal, powder and sublimed sulfur, and having a purity of at least 98 percent and preferably at least 99 percent.

Co-product oligomeric species can include oligomers of general formula I which can be described by general formula Ia:

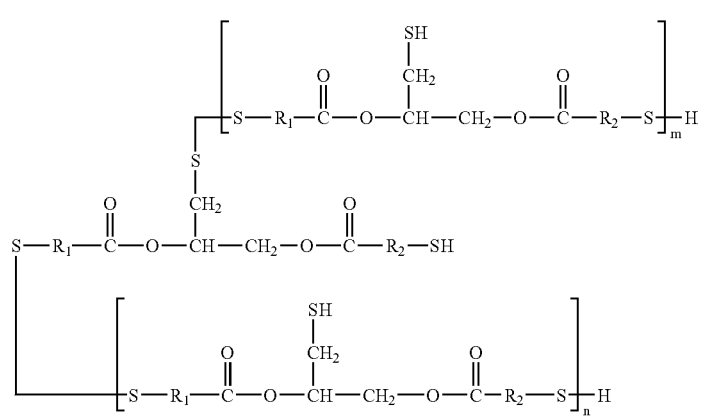

wherein $R_1$ and $R_2$ are as described above, n and m are independently an integer from 0 to 21 and n+m is at least 1. General formula Ia demonstrates that oligomerization can occur through disulfide bonds forming between any of the thiol groups in general structure I. Although all possibilities are not shown, general structure Ia is meant to represent all possible oligomers that can form from general structure 1.

The basic catalyst used to prepare the polythiol oligomer having disulfide linkages may be selected from ammonia, amine and mixtures thereof. Examples of amines include, but are not limited to alkylamines, e.g., ethylamine and n-butylamine, dialkylamines, e.g., diethylamine, trialkylamines, e.g., triethylamine, morpholine, substituted morpholine, piperidine and substituted piperidine. The basic catalyst is typically present in an amount of from 0.001 to 1.0 mole percent, e.g., from 0.01 to 0.1 mole percent, based on the moles of polythiol monomer present at the beginning of the reaction. The basic catalyst may be charged together to a reaction vessel along with the polythiol monomer and sulfur, or may be added to the reaction vessel after the addition of the polythiol monomer and sulfur.

Synthesis of the polythiol oligomer having disulfide linkages may be conducted in the presence of a solvent, e.g., halogenated hydrocarbons, such as chloroform, aliphatic hydrocarbons, such as hexane, aromatic hydrocarbons, such as toluene, and ethers, such as tetrahydrofuran. The polythiol oligomer may be prepared at a temperature ranging from room temperature to the boiling point of the solvent, e.g., from room temperature to 120° C. The preparation of polythiol oligomers having disulfide linkages that are useful in the present invention is described in further detail in U.S. Pat. No. 5,961,889, the disclosure of which is incorporated herein by reference in its entirety.

In an embodiment of the present invention, the polythiol oligomer having disulfide linkages may be selected from those represented by the following general formula II,

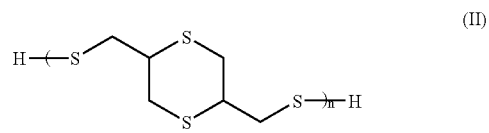

wherein n is an integer from 1 to 21. The polythiol oligomer represented by general formula II may be prepared from the reaction of 2,5-dimeracaptomethyl-1,4-dithiane with sulfur in the presence of a basic catalyst, as described previously herein.

The polycyanate monomer (a)(ii) used to prepare the polycyanate reactant of the first component (a) may be selected from polyisocyanates having at least two isocyanate groups, isothiocyanates having at least two isothiocyanate groups and polycyanates having both isocyanate and isothiocyanate groups. Classes of polyisocyanates from which the polycyanate monomer (a)(ii) may be selected include, but are not limited to: aliphatic polyisocyanates; ethylenically unsaturated polyisocyanates; alicyclic polyisocyanates; aromatic polyisocyanates wherein the isocyanate groups are not bonded directly to the aromatic ring, e.g., α,α'-xylene diisocyanate; aromatic polyisocyanates wherein the isocyanate groups are bonded directly to the aromatic ring, e.g., benzene diisocyanate; aliphatic polyisocyanates containing sulfide linkages; aromatic polyisocyanates containing sulfide or disulfide linkages; aromatic polyisocyanates containing sulfone linkages; sulfonic ester-type polyisocyanates, e.g., 4-methyl-3-isocyanatobenzenesulfonyl-4'-isocyanato-phenol ester; aromatic sulfonic amide-type polyisocyanates; sulfur-containing heterocyclic polyisocyanates, e.g., thiophene-2,5-diisocyanate; halogenated, alkylated, alkoxylated, nitrated, carbodiimide modified, urea modified and biuret modified derivatives of polyisocyanates belonging to these classes; and dimerized and trimerized products of polyisocyanates belonging to these classes. Aliphatic polycyanate monomers containing sulfide linkages as well as other polycyanate monomers having one or more sulfur atoms in the backbone of the monomer are particularly preferred. A particularly preferred sulfur containing polycyanate monomer is one of general formula (III):

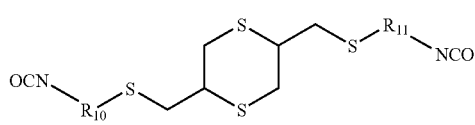
(III)

wherein $R_{10}$ and $R_{11}$, are each independently $C_1$ to $C_3$ alkyl.

Examples of aliphatic polyisocyanates from which the polycyanate monomer (a)(ii) may be selected include, but are not limited to, ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, 2,4,4-trimethylhexamethylene diisocyanate, 1,6,11-undecanetriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis(isocyanatoethyl)-carbonate, bis(isocyanatoethyl)ether, 2-isocyanatopropyl-2,6-diisocyanatohexanoate, lysinediisocyanate methyl ester and lysinetriisocyanate methyl ester.

Examples of ethylenically unsaturated polyisocyanates, include but are not limited to, butene diisocyanate and 1,3-butadiene-1,4-diisocyanate. Alicyclic polyisocyanates from which the polycyanate monomer (a)(ii) may be selected include, but are not limited to, isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Examples of aromatic polyisocyanates wherein the isocyanate groups are not bonded directly to the aromatic ring include, but are not limited to, bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl) diphenyl ether, bis(isocyanatoethyl)phthalate, mesitylene triisocyanate and 2,5-di(isocyanatomethyl)furan. Aromatic polyisocyanates, having isocyanate groups bonded directly to the aromatic ring, from which the polycyanate monomer (a)(ii) may be selected include, but are not limited to, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-toluidine diisocyanate, ortho-tolylidine diisocyanate, ortho-tolylene diisocyanate, 4,4'-diphenylmethane diisocyanate, bis(3-methyl-4-isocyanatophenyl)methane, bis(isocyanatophenyl) ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Aliphatic polyisocyanates containing sulfide linkages from which the polycyanate monomer (a)(ii) may be selected include, but are not limited to, thiodiethyl diisocyanate, thiodipropyl diisocyanate, dithiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate. Examples of aromatic polyisocyanates containing sulfide or disulfide linkages include, but are not limited to, diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

Aromatic polyisocyanates containing sulfone linkages from which the polycyanate monomer (a)(ii) may be selected include, but are not limited to, diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyl-diphenylsulfone-3,3'-diisocyanate and 4,4'-dichlorodiphenylsulfone-3,3'-diisocyanate.

Examples of aromatic sulfonic amide-type polyisocyanates that may be used to prepare the polycyanate reactant include, but are not limited to, 4-methyl-3-isocyanato-benzene-sulfonylanilide-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanato-benzene-sulfonylanilide-4-ethyl-3'-isocyanate.

Classes of polyisothiocyanates from which the polycyanate monomer (a)(ii) may be selected include, but are not limited to: aliphatic polyisothiocyanates; alicyclic polyisothiocyanates, e.g., cyclohexane diisothiocyanates; aromatic polyisothiocyanates wherein the isothiocyanate groups are not bonded directly to the aromatic ring, e.g., α,α'-xylene diisothiocyanate; aromatic polyisothiocyanates wherein the isothiocyanate groups are bonded directly to the aromatic ring, e.g., phenylene diisothiocyanate; heterocyclic polyisothiocyanates, e.g., 2,4,6-triisothicyanato-1,3,5-triazine and thiophene-2,5-diisocyanate; carbonyl polyisothiocyanates; aliphatic polyisothiocyanates containing sulfide linkages, e.g., thiobis(3-isothiocyanatopropane); aromatic polyisothiocyanates containing sulfur atoms in addition to those of the isothiocyanate groups; halogenated, alkylated, alkoxylated, nitrated, carbodiimide modified, urea modified and biuret modified derivatives of polyisothiocyanates belonging to these classes; and dimerized and trimerized products of polyisothiocyanates belonging to these classes.

Examples of aliphatic polyisothiocyanates from which the polycyanate monomer (a)(ii) may be selected include, but are not limited to, 1,2-diisothiocyanatoethane, 1,3-diisothiocyanatopropane, 1,4-diisothiocyanatobutane and 1,6-diisothiocyanatohexane. Examples of aromatic polyisothiocyanates having isothiocyanate groups bonded directly to the aromatic ring include, but are not limited to, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethane-diyl)bis(4-isothiocyanatobenzene), 4,4'-diisothiocyanatobenzophenenone, 4,4'-diisothiocyanato-3,3'-dimethylbenzophenone, benzanilide-3,4'-diisothiocyanate, diphenylether-4,4'-diisothiocyanate and diphenylamine-4,4'-diisothiocyanate.

Carbonyl polyisothiocyanates that may be used to prepare the polycyanate reactant of the first component of the two-component composition include, but are not limited to, hexane-dioyl diisothiocyanate, nonaedioyl diisothiocyanate, carbonic diisothiocyanate, 1,3-benzenedicarbonyl diisothiocyante, 1,4-benzenedicarbonyl diisothiocyanate and (2,2'-bipyridine)-4,4'-dicarbonyl diisothiocyanate. Examples of aromatic polyisothiocyanates containing sulfur atoms in addition to those of the isothiocyanate groups, that may be used in present invention include, but are not limited to, 1-isothiocyanato-4-[(2-isothiocyanato)sulfonyl]benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)-sulfonyl]-2-methoxybenzene, 4-methyl-3-isothiocyanatobenzene-sulfonyl-4'-isothiocyanate phenyl ester and 4-methyl-3-isothiocyanatobenzene-sulfonylanilide-3'-methyl-4'-isothiocyanate.

The polycyanate monomer (a)(ii) used to prepare the polycyanate reactant of the first component of the two-component composition may also be selected from polycyanate monomers having both isocyanate and isothiocyanate groups, which may be, for example, aliphatic, alicyclic, aromatic, heterocyclic, or contain sulfur atoms in addition to those of the isothiocyanate groups. Examples of such compounds, include, but are not limited to, 1-isocyanato-3-isothiocyanatopropane, 1-isocanato-5-isothiocyanatopentane, 1-isocyanato-6-isothiocyanatohexane, isocyanatocarbonyl isothiocyanate, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanato-4'-isothiocyanato-diphenyl sulfide and 2-isocyanato-2'-isothiocyanatodiethyl disulfide.

The polycyanate reactant of the first component of the two-component composition may optionally be prepared from a reactive hydrogen material (a)(iii) that is selected from polyols having at least two hydroxyl groups, materials having both hydroxyl and thiol groups, and mixture thereof. As used herein, by "reactive hydrogen material" is meant a material having reactive hydrogen groups that are capable of forming covalent bonds with isocyanate and isothiocyanate groups.

Classes of polyols from which the optional reactive hydrogen material (a)(iii) may be selected include, but are not limited to: straight or branched chain alkane polyols, e.g., 1,2-ethanediol, 1,3-propanediol, 1,2-propanediol, 1,4-butanediol, 1,3-butanediol, glycerol, neopentyl glycol, trimethylolethane, trimethylolpropane, di-trimethylolpropane, erythritol, pentaerythritol and di-pentaerythritol; polyalkylene glycols, e.g., diethylene glycol, dipropylene glycol and higher polyalkylene glycols such as polyethylene glycols having number average molecular weights of, for example, from 200 to 2,000 grams/mole; cyclic alkane polyols, e.g., cyclopentanediol, cyclohexanediol, cyclohexanetriol, cyclohexanedimethanol, hydroxypropylcyclohexanol and cyclohexanediethanol; aromatic polyols, e.g., dihydroxybenzene, benzenetriol, hydroxybenzyl alcohol and dihydroxytoluene; bisphenols, e.g., 4,4'-isopropylidenediphenol; 4,4'-oxybisphenol, 4,4'-dihydroxybenzophenone, 4,4'-thiobisphenol, phenolphthlalein, bis(4-hydroxyphenyl)methane, 4,4'-(1,2-ethenediyl)bisphenol and 4,4'-sulfonylbisphenol; halogenated bisphenols, e.g., 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, e.g., alkoxylated 4,4'-isopropylidenediphenol having from 1 to 70 alkoxy groups, for example, ethoxy, propoxy, α-butoxy and β-butoxy groups; and biscyclohexanols, which can be prepared by hydrogenating the corresponding bisphenols, e.g., 4,4'-isopropylidene-biscyclohexanol, 4,4'-oxybiscyclohexanol, 4,4'-thiobiscyclohexanol and bis(4-hydroxycyclohexanol)methane.

In one embodiment of the present invention the polyol of which the optional reactive hydrogen material (a)(iii) is selected is a polyurethane prepolymer having two or more hydroxy groups. Hydroxy functional polyurethane prepolymers useful in the present invention can be prepared from any of the above listed polyols and a suitable polyisocyanate. The ratio of molar equivalents of hydroxy groups to isocyanate groups being selected such that a hydroxy functional polyurethane prepolymer having essentially no free isocyanate groups is produced. Examples of polyisocyanates suitable for preparing hydroxy functional polyurethane prepolymers include those as recited previously herein. Hydroxy functional polyurethane prepolymers from which the optional reactive hydrogen material (a)(iii) may be selected typically have number average molecular weights (Mn) of less than 50,000, preferably less than 20,000, and more preferably less than 10,000 grams/mole, as determined by gel permeation chromatography (GPC) using polystyrene standards.

Examples of materials having both hydroxyl and thiol groups from which the optional reactive hydrogen material (a)(iii) may be selected include, but are not limited to, 2-mercaptoethanol, 3-mercapto-1,2-propanediol, glycerin bis(2-mercaptoacetate), glycerin bis(3-mercaptopropionate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, trimethylolpropane bis(2-mercaptoacetate), trimethylolpropane bis(3-mercaptopropionate), pentaerythritol mono(2-mercaptoacetate), pentaerythritol bis(2-mercaptoacetate), pentaerythritol tris(2-mercaptoacetate), pentaerythritol mono(3-mercaptopropionate), pentaerythritol bis(3-mercaptopropionate), pentaerythritol tris (3-mercaptopropionate), hydroxymethyl-tris (mercaptoethylthiomethyl)methane, 1-hydroxyethylthio-3-mercaptoethylthiobenzene, 4-hydroxy-4'- mercaptodiphenylsulfone, dihydroxyethyl sulfide mono(3-mercaptopropionate and hydroxyethylthiomethyl-tris(mercaptoethylthio)methane.

The reaction of the polythiol monomer (a)(i), polycyanate monomer (a)(ii) and optional reactive hydrogen material (a)(iii) may be performed in the presence of a suitable catalyst. Classes of suitable catalysts include, but are not limited to, tertiary amines, such as triethylamine, and organometallic compounds, such as dibutyltin dilaurate. Additional examples of catalysts that may be used in the preparation of the polycyanate reactant are recited below. If a catalyst is used in the preparation of the polycyanate reactant, it is typically present in an amount of less than 5 percent by weight, preferably less than 3 percent by weight, and more preferably less than 1 percent by weight, based on the total weight of (a)(i), (a)(ii) and (a)(iii).

The polyamine reactant of the second component (b) of the two-component composition may be selected from aliphatic polyamine, cycloaliphatic polyamines, aromatic polyamines and mixtures thereof. The polyamine reactant has at least two functional groups selected from primary amine (—NH$_2$), secondary amine (—NH—) and combinations thereof. Preferably the polyamine reactant has at least two primary amine groups.

The polyamine reactant may be selected from any of the family of ethyleneamines, e.g., ethylenediamine (EDA), diethylenetriamine (DETA), triethylenetetramine (TETA), tetraethylenepentamine (TEPA), pentaethylenehexamine (PEHA), piperazine, i.e., diethylenediamine (DEDA), and 2-amino-1-ethylpiperazine. The polyamine reactant may also be selected from one or more isomers of $C_1$–$C_3$ dialkyl toluenediamine, such as, 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine and mixtures thereof. Additional example of polyamines from which the polyamine reactant may be selected include, but are not limited to methylene dianiline and trimethyleneglycol di(para-aminobenzoate).

In an embodiment of the present invention, the polyamine reactant can generally be described as having a one of the following general structures (IV–VI):

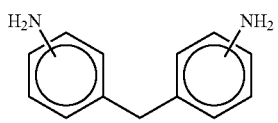

(IV)

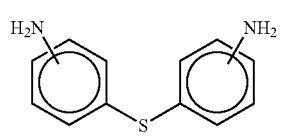

(V)

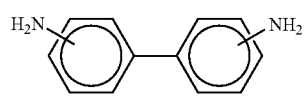

(VI)

Particularly preferred structures include one or more diamines represented by the following general formulas VII–XX,

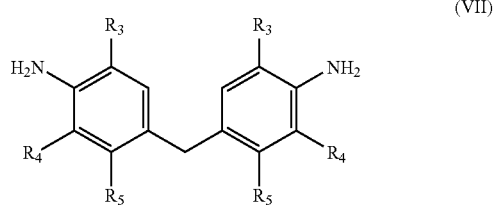

(VII)

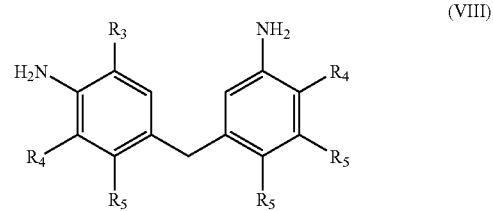

(VIII)

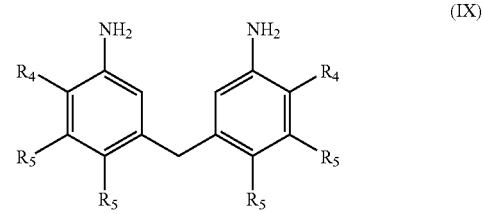

(IX)

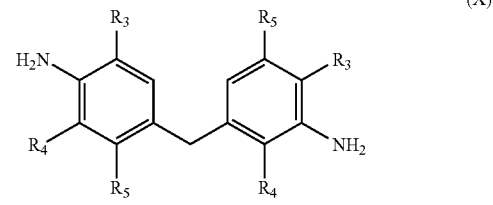

(X)

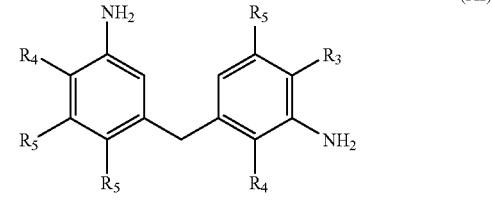

(XI)

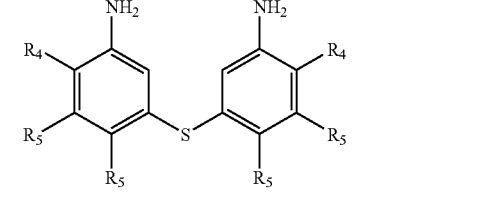

(XII)

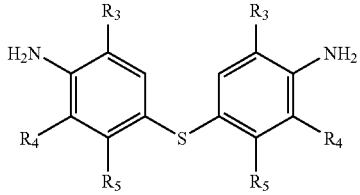

(XIII)

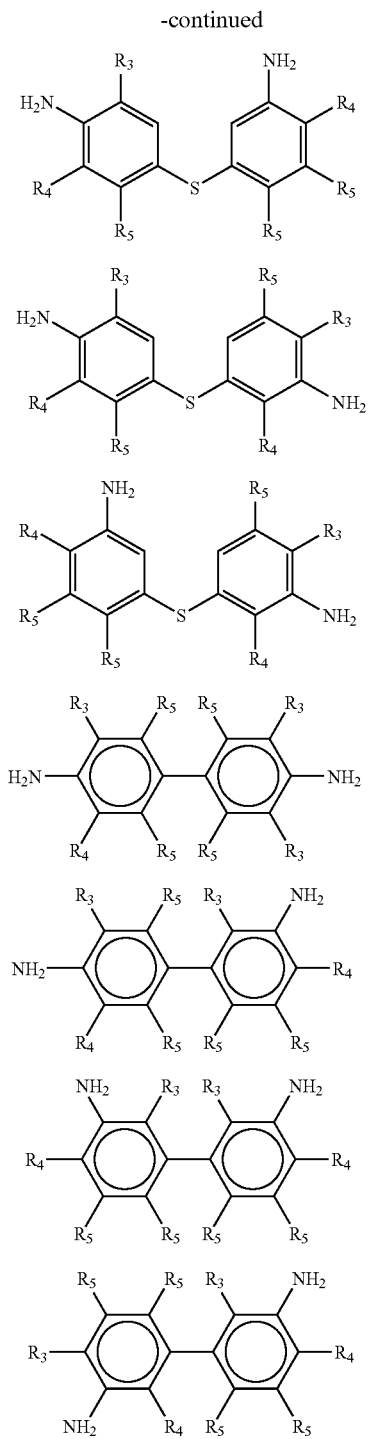

wherein R₃ and R₄ are each independently $C_1$–$C_3$ alkyl, and R₅ is selected from hydrogen and halogen, e.g., chlorine and bromine. The diamine represented by general formula VII can be described generally as a 4,4'-methylene-bis(dialkylaniline). Specific examples of diamines represented by general formula VII include, but are not limited to, 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline) and 4,4'-methylene-bis(2,6-diethyl-3-chloroaniline). A preferred diamine represented by general formula VII is 4,4'-methylene-bis(2,6-diethyl-3-chloroaniline).

Polymerization of the two-component composition in accordance with the method of the present invention may be accomplished by: mixing the first and second components together using, for example, an impeller or extruder; optionally degassing the combined mixture; optionally adding the mixture to a mold; and then heating the mold and the mixture within it over a period of time. The thermal cure cycle utilized may vary depending on, for example, the reactivity and molar ratio of the components used and the presence of any catalyst(s). Typically, the thermal cure cycle involves heating the combined mixture of the two-component composition from room temperature to as high as 200° C. over a period of from 0.5 hours to 72 hours.

Catalysts that may be used with the two-component composition include, for example, tertiary amines, e.g., triethylamine, triisopropylamine and N,N-dimethylbenzylamine, and organometallic compounds, e.g., dibutyltin dilaurate, dibutyltin diacetate and stannous octoate. Additional examples of tertiary amines are listed in U.S. Pat. No. 5,693,738 at column 10 lines 6 through 38, the disclosure of which is incorporated herein by reference. Additional examples of organometallic compounds useful as catalysts are listed in U.S. Pat. No. 5,631,339 at column 4, lines 26 through 46, the disclosure of which is incorporated herein by reference. If used, catalysts are typically incorporated into the second component prior to the combination of the first and second components of the two-component composition. Catalyst levels are typically less than 5% by weight, preferably less than 3% by weight and more preferably less than 1% by weight, based on the total weight of the combined first and second components.

The first and second components of the two-component composition are typically polymerized together in amounts sufficient to provide a molar equivalent ratio of (NCO+NCS) groups to (—NH₂+—NH—) groups of from 0.5 to 3.0, preferably from 0.5 to 1.5, and more preferably from 0.8 to 1.2.

Various conventional additives may be incorporated into the two-component organic composition polymerized in the method of the present invention. Such additives may include light stabilizers, heat stabilizers, antioxidants, ultraviolet light absorbers, mold release agents, static (non-photochromic) dyes, pigments and flexibilizing additives, e.g., alkoxylated phenol benzoates and poly(alkylene glycol) dibenzoates. Anti-yellowing additives, e.g., 3-methyl-2-butenol, organo pyrocarbonates and triphenyl phosphite (CAS registry no. 101-02-0), may also be added to two-component organic composition to enhance resistance to yellowing. Such additives are typically present in the two-component composition in amounts totaling less than 10% by weight, preferably less than 5% by weight, and more preferably less than 3% by weight, based on the total weight of the combined first and second components. While such conventional additives may be added to either of the first or second components of the composition, they are typically incorporated into the second component to minimize the potential of adverse interactions with the isocyanate or isothiocyanate groups of the first component.

Polymerizates prepared in accordance with the method of present invention will be solid, and preferably transparent, e.g., suitable for optical or ophthalmic applications. The polymerizates of the present invention will also have a refractive index of at least 1.6, preferably at least 1.63 and more preferably at least 1.65, adequately high Abbe numbers, e.g., an Abbe number of at least 33 and preferably at least 35, a zero second Barcol hardness of at least 1, and good impact resistance. The reactants and compounds comprising the first and second components of the two-component composition are selected and combined in amounts that allow the preparation of a polymerizate therefrom, which possesses the above listed characteristics. Solid articles that may be prepared according to the method of the present invention include, but are not limited to, optical lenses, such as plano and ophthalmic lenses, sun lenses, windows, automotive transparencies, e.g., windshields, sidelights and backlights, and aircraft transparencies, etc.

When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polymerizates of the present invention are organic photochromic compounds or substances containing same that may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic substances in the aforedescribed patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film; and applying the photochromic substance as a coating or as part of a coating placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms. One example of an imbibing method includes the steps of coating the photochromic article with the photochromic substance; heating the surface of the photochromic article; followed by removing the residual coating from the surface of the photochromic article.

The amount of photochromic substance or composition containing the same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

It is also contemplated that photochromic substances may be added to the two-component organic composition prior to polymerizing, e.g., cast curing, the composition. However, when this is done it is preferred that the photochromic substance(s) be resistant to potentially adverse interactions with, for example, initiator(s) that may be present and/or the isocyanate, isothiocyante and amine groups of the first and second components. These adverse interactions can result in deactivation of the photochromic substance(s), e.g., by trapping them in either an open or closed form. Photochromic substances can also include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polymerizate, as described in U.S. Pat. No. 4,931,220, may also be incorporated into the two-component composition of the present invention prior to curing. If photochromic substances are added to the two-component organic composition of the present invention prior to curing, they are typically incorporated into the second component prior to mixing the first and second components together.

EXAMPLE 1

Thioglycerol bis(2-mercaptoacetate) is a preferred polythiol monomer of the present invention, in which $R_1$ and $R_2$ are each methylene with reference to general formula I. Thioglycerol bis(2-mercaptoacetate) was prepared from the following ingredients.

| Ingredient | Amount (grams) |
|---|---|
| Charge 1 | |
| 3-mercapto-1,2-propanediol | 1995 |
| 2-mercaptoacetic acid | 2333 |
| methane sulfonic acid | 14.2 |
| Charge 2 | |
| aqueous ammonia (a) | 4218 |

(a) An aqueous solution of 5% by weight ammonia.

The ingredients of Charge 1 were added to a five liter round bottom flask equipped with a magnetic stirrer, a thermocouple and heating mantle coupled through a temperature feed-back control device, and a vacuum distillation column. A vacuum of from 5 to 10 millimeters (mm) of Hg was drawn and the reaction mixture was heated to and held at 70° C. for a period of 4 to 5 hours while water was collected from the distillation column.

When no more water was observed to be collected from the distillation column, the reaction mixture was cooled to room temperature and transferred to a six liter round bottom flask equipped with a motor driven stir-blade, a thermocouple and a water cooled jacket. Charge 2 was added to the mixture, which was then stirred for 30 to 45 minutes with an accompanying exotherm of from 10° C. to 20° C. Upon cooling to room temperature, the reaction mixture was left standing to allow the accumulation of an upper ammonia layer, which was removed by suctioning with a pipette. The remaining lower layer was washed three times each with two liters of deionized water. Vacuum stripping of water from the washed layer yielded 1995 grams of thioglycerol bis(2-mercaptoacetate) in the form of a yellowish oil having a refractive index of 1.5825.

EXAMPLES 2 AND 3

A polyisocyanate was mixed with a polythiol (Example 2) and also with a polyol (Example 3) at 80° C. for 2 hours to yield a viscous liquid prepolymer first component. The warm prepolymer first component was rapidly stirred and a diamine second component was added thereto. After the mixture stirred for several seconds, the mixture was immediately charged between two flat glass molds. The filled molds were heated to 120° C. and maintained at that temperature for 16 hours, yielding a plastic sheet. The polyisocyantes used in the examples were α,α'-xylene diisocyanante (XDI) and bis(isocyanatocyclohexyl)methane (H-MDI). The dithiol and polyols were 2,2'-thiodiethanethiol (DMDS) and Tone Polyol 32B8 (UC32B8), Tone Polyol obtained from Union Carbide Corporation, Danbury, Conn. The polyamine second component was diethyltoluenediamine (DETDA). The specific molar composition and molar ratio of each component used for each example are summarized in Table 1. Measured physical properties for each example are summarized in Table 2.

EXAMPLE 4

A first component was prepared by mixing 0.6 equivalents of H-MDI with 1 equivalent of DMDS at 90° C. for an hour. While stirring, 0.6 equivalents of XDI were added to the first component. The mixture was allowed to stir for an additional 1.5 hours to yield the viscous prepolymer. 0.25 equivalents of DETDA were added to the warm prepolymer. After stirring for several seconds, the resulting mixture was charged between two flat glass molds. The filled molds were heated to 120° C. and maintained at that temperature for 16 hours, yielding a plastic sheet.

TABLE 1

| Example No. | Notebook No. | —NCO composition | —SH + —OH composition | NCO/ (SH + (OH) | $NH_2$/ NCO |
|---|---|---|---|---|---|
| 2 | 8247-118 | TMXDI | DMDS | 1.2 | 0.95 |
| 3 | 8247-112 | XDI | 75% DMDS 25% UC32B8 | 1.2 | 0.95 |
| 4 | 8247-123 | 50% XDI 50% H-MDI | DMDS | 1.2 | 0.25 |

TABLE 2

| Example No. | ND ($AR^1$) | ND ($PLM^2$) | Abbe ($AR^1$) | Abbe ($PLM^2$) | Barcol 934 (0–15 sec) |
|---|---|---|---|---|---|
| 2 | 1.604 | 1.604 | 33 | 32 to 38 | 41–39 |
| 3 | — | 1.600 | — | 30 to 51 | — |
| 4 | 1.610 | — | 35 | — | 37–34 |

[1] measured using a B&L Abbe refractometer (AR)
[2] measured using a polarized light microscope (PLM)

The examples demonstrate the excellent high refractive index, high Abbe number and hardness (impact resistance) of the polymerizate of the present invention.

The invention has been described with reference to the preferred embodiments. Obvious modifications and alterations will occur to others upon reading and understanding the detailed description. It is intended that the invention be construed as including all such modifications and alterations insofar as they come within the scope of appended claims or the equivalents thereof.

We claim:

1. A method of preparing a polymerizate comprising the step of polymerizing a two-component composition comprised of:
   (a) a first component containing at least one reactant having at least two functional groups selected from isocyanate, isothiocyanate or combinations thereof, the reactant being the reaction product of,
      (i) a polythiol monomer having at least two thiol groups; and
      (ii) a monomer having at least two functional groups selected from isocyanate, isothiocyanate or combinations thereof; and
   (b) a second component containing at least one polyamine reactant having at least two functional groups selected from primary amine, secondary amine or combinations thereof, wherein said first component and said second component are selected such that when they are polymerized, the resulting polymerizate has a refractive index of at least 1.6, an Abbe number of at least 33 and an initial Barcol hardness of at least 1.

2. The method of claim 1 wherein said first component further comprises (iii) a reactive hydrogen material having at least two reactive hydrogen groups, the reactive hydrogen material being selected from the group consisting of polyols and materials having both hydroxyl and thiol groups; and mixtures thereof.

3. The method of claim 1 wherein the relative amounts of (i) and (ii) in said first component are selected such that the molar equivalents ratio of (NCO+NCS)/(SH) is greater than 1.0.

4. The method of claim 2 wherein the relative amounts of (i), (ii) and (iii) being in said first component are selected such that the molar equivalents ratio of (NCO+NCS)/(SH+OH) is greater than 1.0.

5. The method of claim 2 wherein the relative amounts of (i), (ii) and (iii) are selected such that the molar equivalents ratio of (NCO+NCS)/(SH+OH) is from 1.2:1.0 to 4.0:1.0.

6. The method of claim 1 wherein said polythiol monomer is selected from the group consisting of 2,5-dimercaptomethyl-1,4-dithiane, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate), a polythiol represented by the general formula:

$$HS-R_1-\overset{O}{\underset{\parallel}{C}}-O-\overset{SH}{\underset{|}{\underset{CH_2}{\underset{|}{CH}}}}-CH_2-O-\overset{O}{\underset{\parallel}{C}}-R_2-SH$$

wherein $R_1$ and $R_2$ are each independently selected from straight or branched chain alkylene, cyclic alkylene, phenylene and $C_1$–$C_9$ alkyl substituted phenylene, and oligomers of said polythiols; and mixtures of said polythiol monomers.

7. The method of claim 6, wherein said polythiol oligomer has disulfide linkages and is prepared by reacting a polythiol monomer, with sulfur, in the presence of a basic catalyst.

8. The method of claim 6 wherein said polythiol oligomer is represented by the general formula:

$$H-(-S-\text{[dithiane ring with two CH}_2\text{S branches]}-S-)_n-H$$

wherein n is an integer from 1 to 21.

9. The method of claim 6 wherein said polythiol oligomer is represented by the general formula:

$$\left[-S-R_1-\overset{O}{\underset{\parallel}{C}}-O-\overset{SH}{\underset{|}{\underset{CH_2}{\underset{|}{CH}}}}-CH_2-O-\overset{O}{\underset{\parallel}{C}}-R_2-S-\right]_m H$$

$$\underset{|}{\overset{S}{\underset{|}{CH_2}}}$$

$$S-R_1-\overset{O}{\underset{\parallel}{C}}-O-\overset{}{\underset{|}{CH}}-CH_2-O-\overset{O}{\underset{\parallel}{C}}-R_2-SH$$

$$\left[-S-R_1-\overset{O}{\underset{\parallel}{C}}-O-\overset{SH}{\underset{|}{\underset{CH_2}{\underset{|}{CH}}}}-CH_2-O-\overset{O}{\underset{\parallel}{C}}-R_2-S-\right]_n H$$

wherein $R_1$ and $R_2$ are each independently selected from straight or branched chain alkylene, cyclic alkylene, phenylene or $C_1$–$C_9$ alkyl substituted phenylene and n and m are independently integers from 0 to 21 such that n+m is at least 1.

10. The method of claim 1 wherein said monomer (ii) is a material having at least two isocyanate groups.

11. The method of claim 1 wherein said monomer (ii) is a material having one or more sulfur atoms in its backbone.

12. The method of claim 11 wherein the monomer having one or more sulfur atoms in its backbone is one having the general structure:

$$OCN-R_{10}-S-\text{[dithiane ring]}-S-R_{11}-NCO$$

wherein $R_{10}$ and $R_{11}$ are each independently $C_1$ to $C_3$ alkyl.

13. The method of claim 10 wherein said monomer is selected from the group consisting of α, α'-xylene diisocyanate, α,α,α',α'-tetramethylxylene diisocyanate, isophorone diisocyanate, bis(isocyanatocyclohexyl)methane, ortho-toluidine diisocyanate, ortho-tolylidine diisocyanate, ortho-tolylene diisocyanate and 4,4'-diphenylmethane diisocyanate, and mixtures of said monomers.

14. The method of claim 1 wherein said polyamine reactant of said second component is selected from the group consisting of ethyleneamines, $C_1$–$C_3$ dialkyl toluenediamine, methylene dianiline, trimethyleneglycol di(para-aminobenzoate), a diamine represented by the general formula (A):

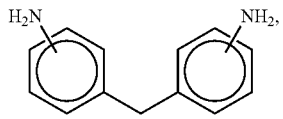 (A)

a diamine represented by the general formula (B):

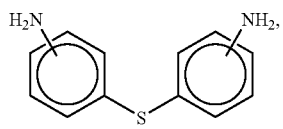 (B)

and a diamine represented by the general formula (C):

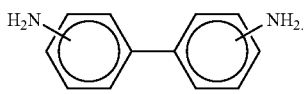 (C)

15. The method of claim 14 wherein the diamine of general formula (A) is selected from one or more of the group consisting of:

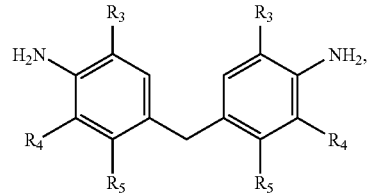

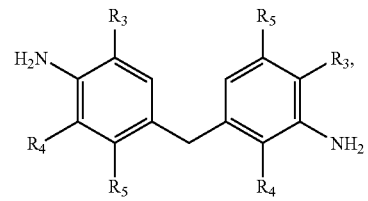

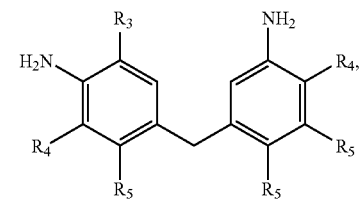

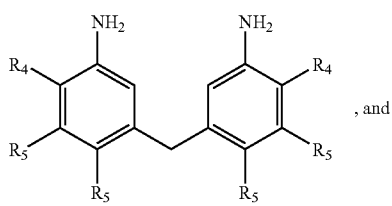, and

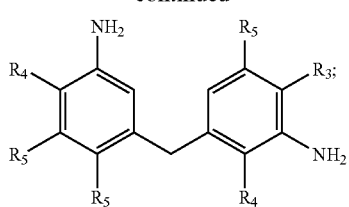

wherein $R_3$ and $R_4$ are each independently $C_1$–$C_3$ alkyl, and $R_5$ is selected from hydrogen and halogen, and mixtures of said diamines.

16. The method of claim 14 wherein the diamine of general formula (B) is selected from one or more of the group consisting of:

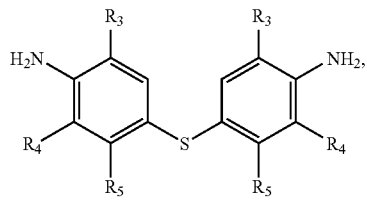

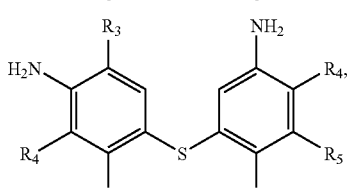

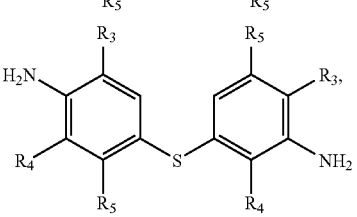

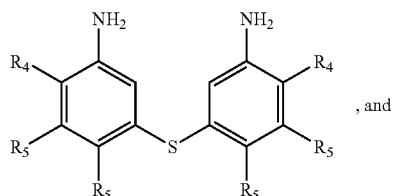, and

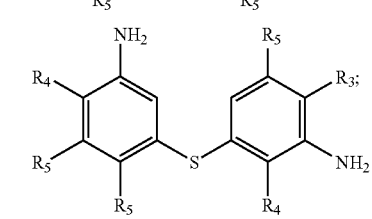

wherein $R_3$ and $R_4$ are each independently $C_1$–$C_3$ alkyl, and $R_5$ is selected from hydrogen and halogen, and mixtures of said diamines.

17. The method of claim 14 wherein the diamine of general formula (C) is selected from one or more of the group consisting of:

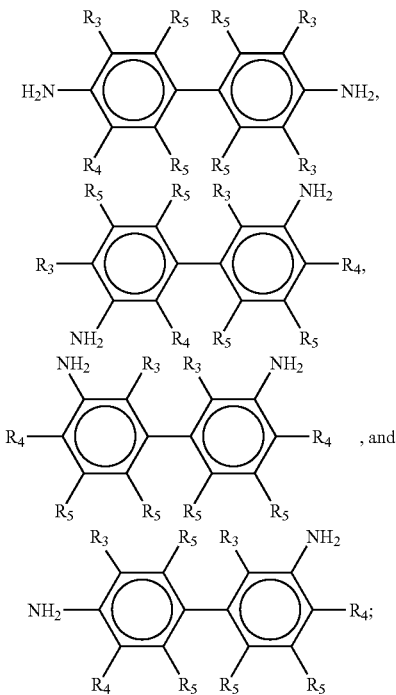

wherein $R_3$ and $R_4$ are each independently $C_1$–$C_3$ alkyl, and $R_5$ is selected from hydrogen and halogen, and mixtures of said diamines.

18. The method of claim 1 further comprising the step of adding a catalyst to said two-component composition.

19. The method of claim 18 wherein said catalyst is selected from the group consisting of tertiary amines and organometallic compounds.

20. The method of claim 1 further comprising the step of: mixing said first component and said second component.

21. The method of claim 1 further comprising the step of: degassing said first component.

22. The method of claim 1 further comprising the step of: degassing said second component.

23. The method of claim 20 further comprising the step of: adding the mixture to a mold.

24. The method of claim 23 further comprising the step of: heating the mold and the mixture of said first component and said second component within it.

25. The method of claim 24 wherein said heating step further includes heating the mold and said mixture to a temperature of up to 200° C. over a period of from 0.5 to 72 hours.

26. The method of claim 1 wherein said first component and said second component are polymerized together in amounts sufficient to provide a molar equivalent ratio of (NCO+NCS) groups to (—NH$_2$+—NH—) groups of from 0.5 to 3.0.

27. The method of claim 1 further comprising the step of adding additives selected from the group consisting of light stabilizers, heat stabilizers, antioxidants, ultraviolet light absorbers, mold release agents, static (non-photochromic) dyes, pigments and flexibilizing additives and anti-yellowing additives; and mixtures of said additives.

28. The method of claim 27 wherein the additives are present in said two component composition, in an amount up to 10% by weight of said two component composition.

29. The method of claim 1 wherein said polymerizate further comprises a photochromic substance.

30. A polymerizate prepared by polymerizing a two-component composition comprised of:
(a) a first component containing at least one reactant having at least two functional groups selected from isocyanate, isothiocyanate or combinations thereof, the reactant being the reaction product of,
  (i) a polythiol monomer having at least two thiol groups; and
  (ii) a monomer having at least two functional groups selected from isocyanate, isothiocyanate or combinations thereof; and
(b) a second component containing at least one polyamine reactant having at least two functional groups selected from primary amine, secondary amine or combinations thereof, wherein said first component and said second component are selected such that the resulting polymerizate has a refractive index of at least 1.6, an Abbe number of at least 33 and an initial Barcol hardness of at least 1.

31. The polymerizate of claim 30 wherein said first component further comprises (iii) a reactive hydrogen material having at least two reactive hydrogen groups, the reactive hydrogen material being selected from the group consisting of polyols and materials having both hydroxyl and thiol groups, and mixtures thereof.

32. The polymerizate of claim 30 wherein the relative amounts of (i) and (ii) in said first component are selected such that the molar equivalents ratio of (NCO+NCS)/(SH) is greater than 1.0.

33. The polymerizate of claim 31 wherein the relative amounts of (i), (ii) and (iii) being in said first component are selected such that the molar equivalents ratio of (NCO+NCS)/(SH+OH) is greater than 1.0.

34. The polymerizate of claim 33 wherein the relative amounts of (i), (ii) and (iii) are selected such that the molar equivalents ratio of (NCO+NCS)/(SH+OH) is from 1.2:1.0 to 4.0:1.0.

35. The polymerizate of claim 30 wherein said polythiol monomer is selected from the group consisting of 2,5-dimercaptomethyl-1,4-dithiane, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate) and a polythiol represented by the general formula:

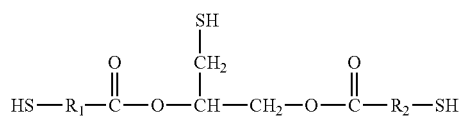

wherein $R_1$ and $R_2$ are each independently selected from straight or branched chain alkylene, cyclic alkylene, phenylene and $C_1$–$C_9$ alkyl substituted phenylene, and oligomers of said polythiols; and mixtures of said polythiol monomers.

36. The polymerizate of claim 35 wherein said polythiol oligomer has disulfide linkages and is prepared by reacting a polythiol monomer with sulfur in the presence of a basic catalyst.

37. The polymerizate of claim 35 wherein said polythiol oligomer is represented by the general formula:

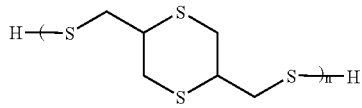

wherein n is an integer from 1 to 21.

38. The polymerizate of claim 35 wherein said polythiol oligomer is represented by the general formula:

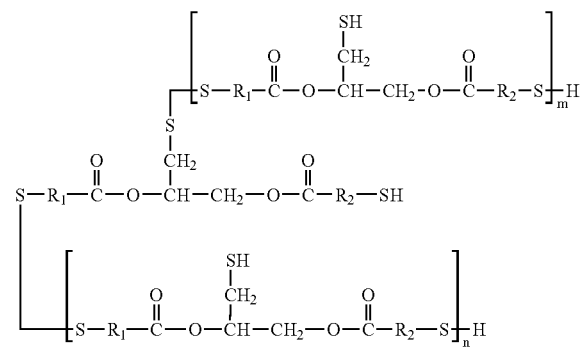

wherein $R_1$ and $R_2$ are each independently selected from straight or branched chain alkylene, cyclic alkylene, phenylene or $C_1$–$C_9$ alkyl substituted phenylene and n and m are independently integers from 0 to 21 such that n+m is at least 1.

39. The polymerizate of claim 30 wherein said monomer is a material having at least two isocyanate groups.

40. The polymerizate of claim 39 wherein said monomer is selected from the group consisting of α,α'-xylene diisocyanate, α,α,α',α'-tetramethylxylene diisocyanate, isophorone diisocyanate, bis(isocyanatocyclohexyl)methane, ortho-toluidine diisocyanate, ortho-tolylidine diisocyanate, ortho-tolylene diisocyanate and 4,4'-diphenylmethane diisocyanate, and mixtures of said monomers.

41. The polymerizate of claim 30 wherein said polyamine reactant of said second component is selected from the group consisting of ethyleneamines, $C_1$–$C_3$ dialkyl toluenediamine, methylene dianiline, trimethyleneglycol di(para-aminobenzoate), a diamine represented by the general formula (A):

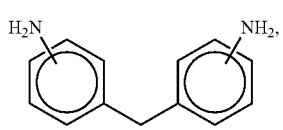

a diamine represented by the general formula (B):

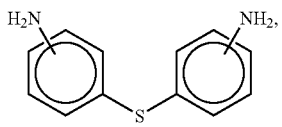

and a diamine represented by the general formula (C):

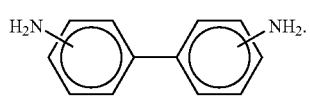

42. The polymerizate of claim 41 wherein the diamine of general formula (A) is selected from one or more of the group consisting of:

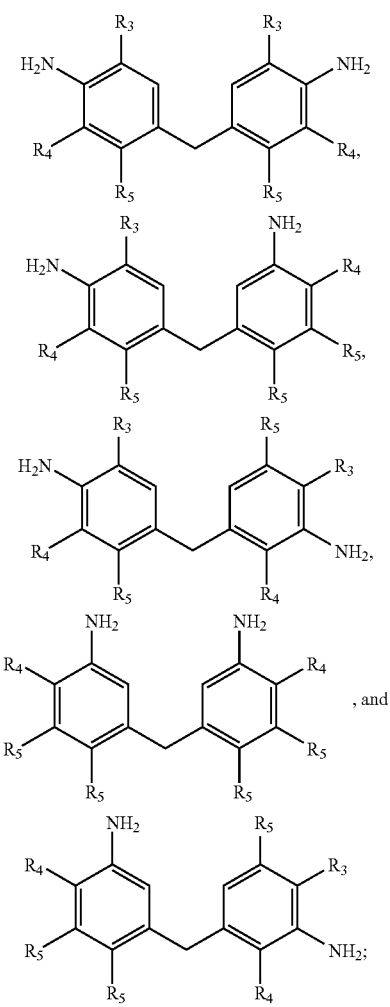

wherein $R_3$ and $R_4$ are each independently $C_1$–$C_3$ alkyl, and $R_5$ is selected from hydrogen or halogen, or mixtures of said diamines.

43. The polymerizate of claim 41 wherein the diamine of general formula (B) is selected from one or more of the group consisting of:

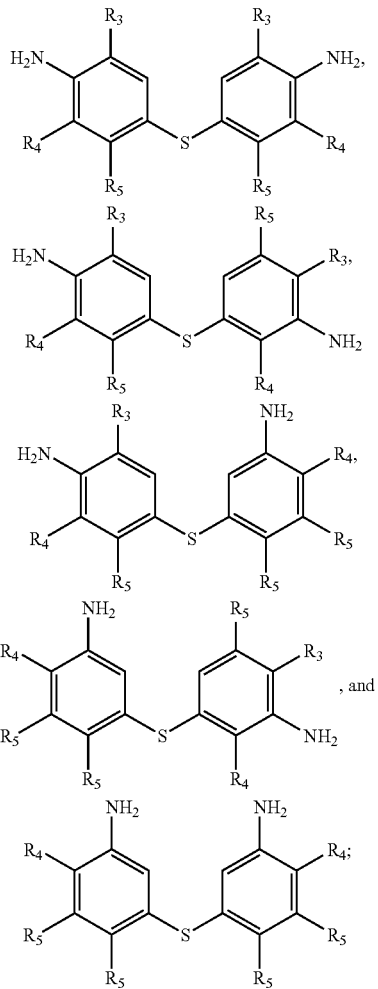

wherein $R_3$ and $R_4$ are each independently $C_1$–$C_3$ alkyl, and $R_5$ is selected from hydrogen or halogen, or mixtures of said diamines.

44. The polymerizate of claim 41 wherein the diamine of general formula (C) is selected from one or more of the group consisting of:

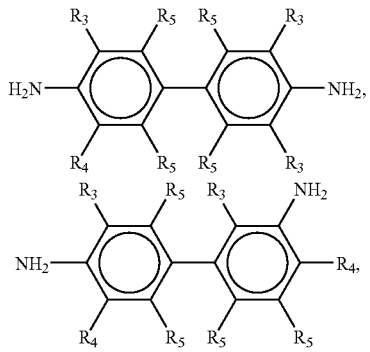

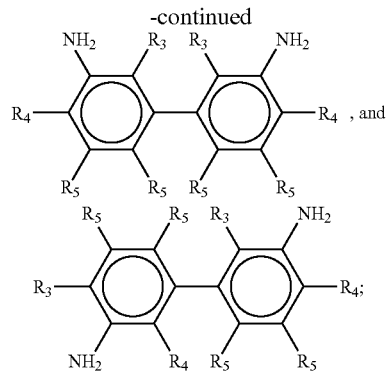

wherein $R_3$ and $R_4$ are each independently $C_1$–$C_3$ alkyl, and $R_5$ is selected from hydrogen or halogen, or mixtures of said diamines.

45. The polymerizate of claim 30 wherein a catalyst is added to said two-component composition to promote the polymerization.

46. The polymerizate of claim 45 wherein said catalyst is selected from the group consisting of tertiary amines and organometallic compounds.

47. The polymerizate of claim 30 wherein the polymerization process further comprises the step of:
    mixing said first component and said second component.

48. The polymerizate of claim 30 wherein the polymerization further comprises the step of:
    degassing said first component.

49. The polymerizate of claim 30 wherein the polymerization further comprises the step of:
    degassing said second component.

50. The polymerizate of claim 47 wherein the polymerization further comprising the step of:
    adding the mixture to a mold.

51. The polymerizate of claim 50 wherein the polymerization further comprising the step of:
    heating the mold and the mixture of said first component and said second component within it.

52. The polymerizate of claim 51 wherein said heating step further includes heating the mold and said mixture to a temperature of up to 200° C. over a period of from 0.5 to 72 hours.

53. The polymerizate of claim 30 wherein said first component and said second component are polymerized together in amounts sufficient to provide a molar equivalent ratio of (NCO+NCS) groups to (—$NH_2$+—NH—) groups of from 0.5 to 3.0.

54. The polymerizate of claim 30 further comprising additives selected from the group consisting of light stabilizers, heat stabilizers, antioxidants, ultraviolet light absorbers, mold release agents, static (non-photochromic) dyes, pigments or flexibilizing additives or anti-yellowing additives; or mixtures of said additives.

55. The polymerizate of claim 54 wherein the additives are present in said polymerizate in an amount up to 10% by weight of said polymerizate.

56. The polymerizate of claim 30 further comprising a photochromic substance.

57. A photochromic article derived from a polymerizate prepared by polymerizing a two-component composition comprised of:
    (a) a first component containing at least one reactant having at least two functional groups selected from isocyanate, isothiocyanate or combinations thereof, the reactant being the reaction product of,
(i) a polythiol monomer having at least two thiol groups; and
(ii) a monomer having at least two functional groups selected from isocyanate, isothiocyanate or combinations thereof; and
(b) a second component containing at least one polyamine reactant having at least two functional groups selected from primary amine, secondary amine or combinations thereof.

58. The photochromic article of claim 57 wherein said first component further comprises (iii) a reactive hydrogen material having at least two reactive hydrogen groups, the reactive hydrogen material being selected from the group consisting of polyols and materials having both hydroxyl and thiol groups, and mixtures thereof.

59. The photochromic article of claim 57 wherein the relative amounts of (i) and (ii) in said first component are selected such that the molar equivalents ratio of (NCO+NCS)/(SH) is greater than 1.0.

60. The photochromic article of claim 58 wherein the relative amounts of (i), (ii) and (iii) being in said first component are selected such that the molar equivalents ratio of (NCO+NCS)/(SH+OH) is greater than 1.0.

61. The photochromic article of claim 57 wherein said first component and said second component are selected such that when they are polymerized, the resulting polymerizate has a refractive index of at least 1.6, an Abbe number of at least 33 and an initial Barcol hardness of at least 1.

62. The photochromic article of claim 58 wherein the relative amounts of (i), (ii) and (iii) are selected such that the molar equivalents ratio of (NCO+NCS)/(SH+OH) is from 1.2:1.0 to 4.0:1.0.

63. The photochromic article of claim 57 wherein said polythiol monomer is selected from the group consisting of 2,5-dimercaptomethyl-1,4-dithiane, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate), a polythiol represented by the general formula:

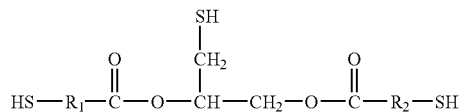

wherein $R_1$ and $R_2$ are each independently selected from straight or branched chain alkylene, cyclic alkylene, phenylene and $C_1$–$C_9$ alkyl substituted phenylene, and oligomers of said polythiols; and mixtures of said polythiol monomers.

64. The photochromic article of claim 63 wherein said polythiol oligomer has disulfide linkages and is prepared by reacting a polythiol monomer with sulfur in the presence of a basic catalyst.

65. The photochromic article of claim 63 wherein said polythiol oligomer is represented by the general formula:
wherein n is an integer from 1 to 21

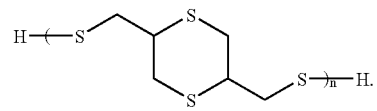

66. The photochromic article of claim 63 wherein said polythiol oligomer is represented by the general formula:

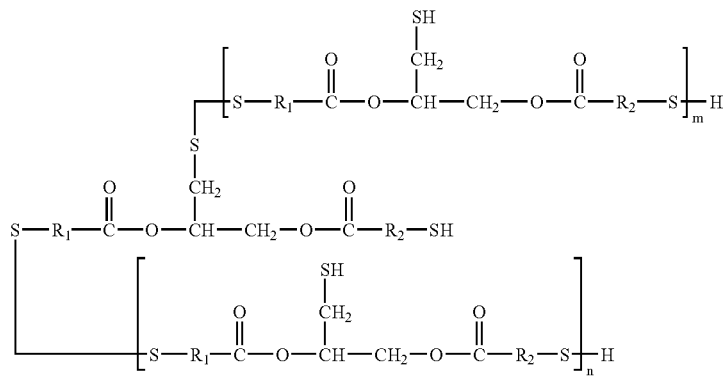

wherein $R_1$ and $R_2$ are each independently selected from straight or branched chain alkylene, cyclic alkylene, phenylene or $C_1$–$C_9$ alkyl substituted phenylene and n and m are independently integers from 0 to 21 such that n+m is at least 1.

67. The photochromic article of claim 57 wherein said monomer is a material having at least two isocyanate groups.

68. The photochromic article of claim 67 wherein said monomer is selected from the group consisting of α,α'-xylene diisocyanate, α,α,α',α'-tetramethylxylene diisocyanate, isophorone diisocyanate, bis(isocyanatocyclohexyl)methane, ortho-toluidine diisocyanate, ortho-tolylidine diisocyanate, ortho-tolylene diisocyanate and 4,4'-diphenylmethane diisocyanate, and mixtures of said monomers.

69. The photochromic article of claim 57 wherein said polyamine reactant of said second component is selected from the group consisting of ethyleneamines, $C_1$–$C_3$ dialkyl toluenediamine, methylene dianiline, trimethyleneglycol di(para-aminobenzoate), a diamine represented by the general formula (A):

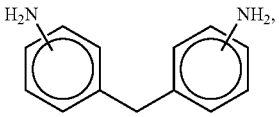

a diamine represented by the general formula (B):

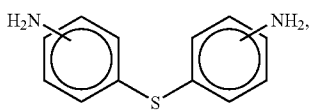

and a diamine represented by the general formula (C):

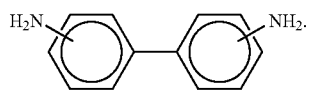

70. The photochromic article of claim 69 wherein the diamine of general formula (A) is selected from one or more of the group consisting of:

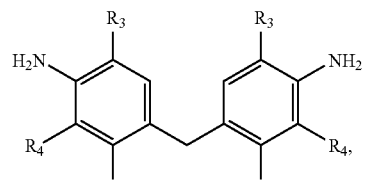

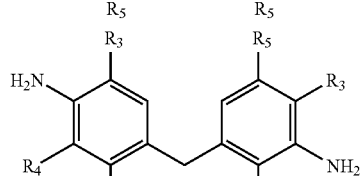

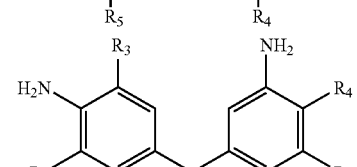

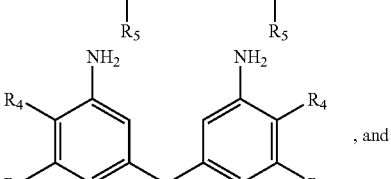

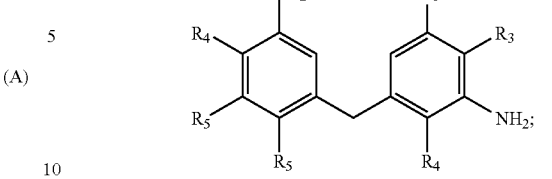

wherein $R_3$ and $R_4$ are each independently $C_1$–$C_3$ alkyl, and $R_5$ is selected from hydrogen or halogen, or mixtures of said diamines.

71. The photochromic article of claim 69 wherein the diamine of general formula (B) is selected from one or more of the group consisting of:

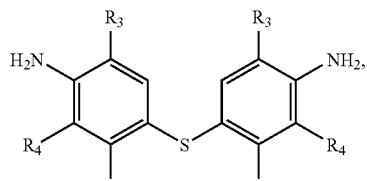

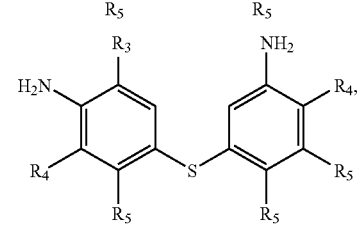

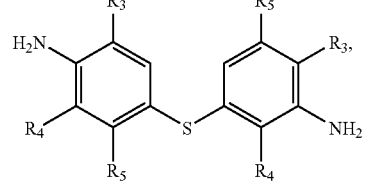

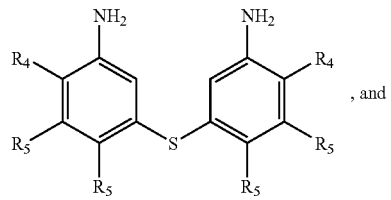

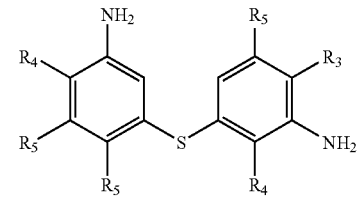

wherein $R_3$ and $R_4$ are each independently $C_1$–$C_3$ alkyl, and $R_5$ is selected from hydrogen or halogen, or mixtures of said diamines.

72. The photochromic article of claim 69 wherein the diamine of general formula (C) is selected from one or more of the group consisting

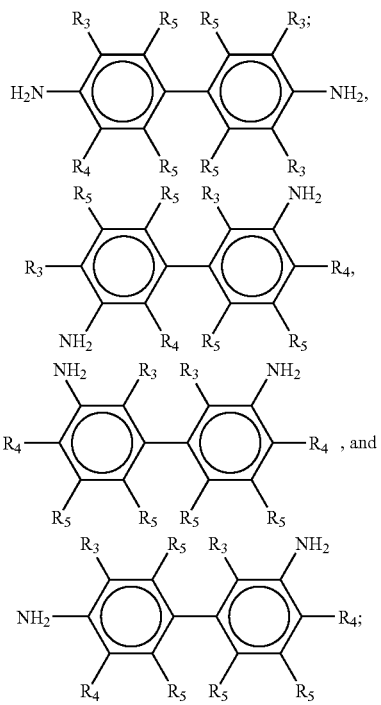

of:
wherein R₃ and R₄ are each independently $C_1$–$C_3$ alkyl, and R₅ is selected from hydrogen or halogen, or mixtures of said diamines.

73. The photochromic article of claim 57 wherein a catalyst is added to said two-component composition to promote the polymerization.

74. The photochromic article of claim 73 wherein said catalyst is selected from the group consisting of tertiary amines and organometallic compounds.

75. The photochromic article of claim 57 wherein the polymerization process further comprises the step of:
  mixing said first component and said second component.

76. The photochromic article of claim 57 wherein the polymerization process further comprises the step of:
  degassing the said first component.

77. The photochromic article of claim 57 wherein the polymerization process further comprises the step of:
  degassing the said second component.

78. The photochromic article of claim 57 wherein the polymerization process further comprises the step of:
  adding a mixture of said first component and said second component to a mold.

79. The photochromic article of claim 78 wherein the polymerization process further comprises the step of:
  heating the mold and said mixture within it.

80. The photochromic article of claim 79 wherein said heating step further includes heating the mold and said mixture to a temperature of up to 200° C. over a period of from 0.5 to 72 hours.

81. The photochromic article of claim 57 wherein said first component and said second component are polymerized together in amounts sufficient to provide a molar equivalent ratio of (NCO+NCS) groups to (—NH₂+—NH—) groups of from 0.5 to 3.0.

82. The photochromic article of claim 57 further comprising additives selected from the group consisting of light stabilizers, heat stabilizers, antioxidants, ultraviolet light absorbers, mold release agents, static (non-photochromic) dyes, pigments and flexibilizing additives and anti-yellowing additives; and mixtures of said additives.

83. The photochromic article of claim 82 wherein the additives are present in said polymerizate in an amount up to 10% by weight of said polymerizate.

84. The photochromic article of claim 57 further comprising a photochromic substance.

85. The photochromic article of claim 84 wherein the photochromic substance is mixed with said first component.

86. The photochromic article of claim 84 wherein the photochromic substance is mixed with said second component.

87. The photochromic article of claim 84 wherein the photochromic substance is applied to said photochromic article at from 0.15 to 0.35 milligrams per square centimeter of surface area of said photochromic article.

88. The photochromic article of claim 84 wherein said photochromic substance is selected from the group consisting of spiro(indoline)naphthoxazines, spiro(indoline)benzoxazines, chromenes, benzopyrans, naphthopyrans, organo-metal dithizonates, (arylazo)-thioformic arylhydrazidates, mercury dithizonates, fulgides, fulgimides, 3-furyl fulgides, 3-thienyl fulgides, 3-furyl fulgimides and 3-thienyl fulgimide; and mixtures of said photochromic substances.

89. The photochromic article of claim 84 wherein the photochromic substance has an activated absorption maximum within the visible range of from 590 to 700 nanometers.

90. The photochromic article of claim 84 wherein the photochromic substance has an activated absorption maximum within the visible range of from 400 to 500 nanometers.

91. The photochromic article of claim 84 wherein the photochromic substance has an activated absorption maximum within the visible range of from 500 to 700 nanometers.

92. The photochromic article of claim 84 wherein the photochromic substance is applied or incorporated into said photochromic article using a method selected from the list consisting of cast curing, encapsulating within a matrix of an organic polymerizate and incorporating into the two-component composition prior to curing.

93. The photochromic article of claim 84 wherein the photochromic substance is applied by imbibing the photochromic article such that permeation of the photochromic substance into the polymerizate is achieved.

94. The photochromic article of claim 93 wherein the imbibing process includes solvent assisted transfer absorption.

95. The photochromic article of claim 93 wherein the imbibing process includes vapor phase transfer.

96. The photochromic article of claim 93 wherein the photochromic substance is applied as a coating to the surface of the photochromic article.

97. The photochromic article of claim 93 wherein the imbibing process includes the steps of:
  coating the photochromic article with the photochromic substance;
  heating the surface of the photochromic article; and
  removing the residual coating from the surface of the photochromic article.

98. The photochromic article of claim 84 wherein the photochromic article is an optical lens for correcting a visual defect.

99. The photochromic article of claim 57 wherein said monomer has contains one or more sulfur atoms in its backbone.

100. The photochromic article of claim 99 wherein the monomer containing one or more sulfur atoms in its backbone has the general structure:

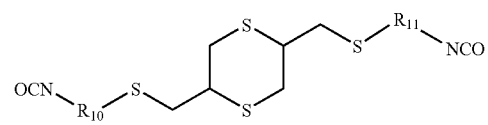

wherein $R_{10}$ and $R_{11}$ are each independently $C_1$ to $C_3$ alkyl.

* * * * *